(12) United States Patent  (10) Patent No.: US 8,338,050 B2
Suzuki et al.  (45) Date of Patent: Dec. 25, 2012

(54) MEMBRANE ELECTRODE ASSEMBLY FOR FUEL CELL

(75) Inventors: Shuichi Suzuki, Hitachinaka (JP); Jun Kawaji, Hitachi (JP); Yoshiyuki Takamori, Hitachinaka (JP); Makoto Morishima, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/858,515

(22) Filed: Aug. 18, 2010

(65) Prior Publication Data

US 2011/0076591 A1 Mar. 31, 2011

(30) Foreign Application Priority Data

Sep. 30, 2009 (JP) ................................. 2009-225882

(51) Int. Cl.
*H01M 8/10* (2006.01)
(52) U.S. Cl. ........................................ 429/480; 429/465
(58) Field of Classification Search .......... 429/530–535, 429/480, 492, 505, 516, 465, 467, 469
See application file for complete search history.

(56) References Cited

U.S. PATENT DOCUMENTS

| 6,183,898 | B1 * | 2/2001 | Koschany et al. ............ 429/481 |
| 7,338,732 | B1 | 3/2008 | Cooper et al. |
| 2004/0018410 | A1 * | 1/2004 | Dai ................................ 429/33 |
| 2004/0086775 | A1 | 5/2004 | Lloyd et al. |
| 2007/0248873 | A1 * | 10/2007 | Son et al. ........................ 429/40 |
| 2008/0138683 | A1 * | 6/2008 | Yoshikawa ..................... 429/30 |
| 2010/0203427 | A1 | 8/2010 | Hasebe et al. |

FOREIGN PATENT DOCUMENTS

| DE | 102007025207 A1 * | 12/2008 |
| EP | 1 868 258 | 12/2007 |
| JP | 63-236262 | 10/1988 |
| JP | 2003-502827 | 1/2003 |
| JP | 2005-183014 | 7/2005 |
| JP | 2008-210796 | 9/2008 |
| JP | 20099199915 A1 * | 3/2009 |
| WO | WO 2007/034756 | 3/2007 |

OTHER PUBLICATIONS

Extended European Search Report issued in European Application No. 10173184.2 on Jan. 12, 2011.
Office Action issued in Japanese Patent Application No. 2009-225882 on Nov. 29, 2011.

* cited by examiner

*Primary Examiner* — Jennifer K Michener
*Assistant Examiner* — Monique Wills
(74) *Attorney, Agent, or Firm* — Antonelli, Terry, Stout & Kraus, LLP.

(57) ABSTRACT

The membrane electrode assembly includes an anode including a catalyst and a solid polymer electrolyte; a cathode including a catalyst and a solid polymer electrolyte; a solid polymer electrolyte membrane interposed between the anode and the cathode; an anode gas diffusion layer; and a cathode gas diffusion layer, a set composed of the anode, the cathode and the solid polymer electrolyte membrane being interposed between the anode gas diffusion layer and the cathode gas diffusion layer, wherein the cathode gas diffusion layer contains an oxidation catalyst and a water-repellent resin.

5 Claims, 3 Drawing Sheets

US 8,338,050 B2

MEMBRANE ELECTRODE ASSEMBLY FOR FUEL CELL

CLAIM OF PRIORITY

The present application claims priority from Japanese Patent application serial No. 2009-225882, filed on Sep. 30, 2009, the content of which is hereby incorporated by reference into this application.

BACKGROUND OF THE INVENTION

1. Field of the Invention

The present invention relates to a membrane electrode assembly used for a fuel cell.

2. Description of Related Art

The increase in the amount of information caused by the recent progress of electronic technologies has yielded needs to process the increased information faster and more sophisticatedly. In order to respond to the needs, a power source of a high output density and a high energy density, namely a power source capable of continuous operation for a long time, is required.

There is an increasing demand for a small generator not requiring charge, namely a micro generator capable of being supplied with a fuel easily. Under the situation, the importance of a fuel cell has been worked on.

A fuel cell is a generator that comprises at least a solid or liquid electrolyte and two electrodes, an anode and a cathode, which cause intended electrochemical reactions; and directly converts the chemical energy of a fuel into electric energy with high efficiency.

Among such fuel cells, a fuel cell which uses a solid polymer electrolyte membrane as the electrolyte membrane and hydrogen as a fuel is called a solid polymer type fuel cell (PEFC: Polymer Electrolyte Fuel Cell). Then a fuel cell which uses methanol as a fuel is called a direct methanol type fuel cell (DMFC: Direct Methanol Fuel Cell). In particular, a DMFC that uses a liquid fuel attracts attention as being effective as a transportable or mobile small power source because the fuel has a high energy density per unit volume.

In a DMFC, a methanol crossover phenomenon wherein methanol supplied to the anode permeates the solid polymer electrolyte and reaches the cathode occurs. The methanol having reached the cathode is oxidized by oxygen supplied to the cathode and discharged as carbon dioxide. In the oxidation reaction process, intermediate products such as formic acid and formaldehyde are produced more than a little and discharged from the fuel cell. Further, there is some methanol that is discharged as it is from the fuel cell without being oxidized. Since methanol, formic acid and formaldehyde discharged from the fuel cell as stated above are harmful to human bodies, the quantities should be reduced to the utmost extent.

As an example of a method for removing methanol, formic acid and formaldehyde that are hazardous materials emitted from the cathode, there is a method of installing a filter containing a byproduct gas absorbent in an exhaust gas pipe of the cathode as described in (JP-A No. 2008-210796) Patent Document 1. Further, there is a method of installing a filter containing a catalyst to decompose the hazardous materials in the exhaust gas pipe as described in (JP-A No. 2005-183014) Patent Document 2.

SUMMARY OF THE INVENTION

In case of using an absorbent, the absorption capacity of the absorbent is limited, and hence it is difficult to keep the effect of removing hazardous materials for a long period of time. Further, In case of installing a catalytic filter in an exhaust gas pipe, the filter resists the flow of an exhaust gas, hence the capacity of a blower has to be increased, the power loss by an auxiliary machine increases, and resultantly the efficiency of the fuel cell system lowers undesirably.

In view of the above situation, an object of the present invention is to provide a membrane electrode assembly for a fuel cell and a fuel cell system, which influence less system efficiency of the fuel cell and reduce the amount of emission of the hazardous materials for a long period of time.

The membrane electrode assembly for the fuel cell according to an embodiment of the present invention comprises an anode including a catalyst and a solid polymer electrolyte; a cathode including a catalyst and a solid polymer electrolyte; a solid polymer electrolyte membrane interposed between the anode and the cathode; an anode gas diffusion layer; and a cathode gas diffusion layer, a set composed of the anode, the cathode and the solid polymer electrolyte membrane being interposed between the anode gas diffusion layer and the cathode gas diffusion layer, wherein the cathode gas diffusion layer contains an oxidation catalyst and a water-repellent resin.

DETAILED DESCRIPTION OF THE PREFERRED EMBODIMENTS

Figure 1:
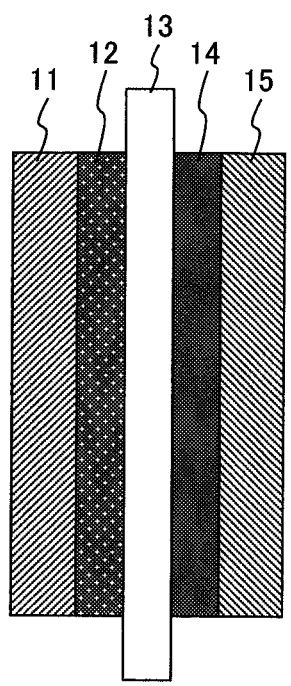
FIG. 1 is a schematic sectional view showing a membrane electrode assembly for a fuel cell of an embodiment.

The membrane electrode assembly for the fuel cell according to an embodiment of the present invention comprises an anode including a catalyst and a solid polymer electrolyte; a cathode including a catalyst and a solid polymer electrolyte; a solid polymer electrolyte membrane interposed between the anode and the cathode; an anode gas diffusion layer; and a cathode gas diffusion layer, a set composed of the anode, the cathode and the solid polymer electrolyte membrane being interposed between the anode gas diffusion layer and the cathode gas diffusion layer, wherein the cathode gas diffusion layer contains an oxidation catalyst and a water-repellent resin.

That is, the solid polymer electrolyte membrane is disposed on a side of the anode, and the anode gas diffusion layer is disposed on an opposite side of the anode. Further, the solid polymer electrolyte membrane is disposed on a side of the cathode, and the cathode gas diffusion layer is disposed on an opposite side of the cathode.

Further, it is preferable that the oxidation catalyst contained in the cathode gas diffusion layer is an element selected from the group consisting of platinum, palladium, copper, silver, tungsten, molybdenum, iron, nickel, cobalt, manganese, zinc and vanadium.

Further, it is preferable that the water-repellent resin contained in the cathode gas diffusion layer is a resin selected from the group consisting of polytetrafluoroethylene, polychlorotrifluoroethylene, polyvinylidene fluoride, polyvinyl fluoride, perfluoro-alkoxy fluororesin, a tetrafluoroethylene-hexafluoropropylene copolymer, an ethylene-tetrafluoroethylene copolymer, an ethylene-chlorotrifluoroethylene copolymer, polyethylene, polyolefin, polypropylene, polyaniline, polythiophene and polyester.

Further, it is desirable that the oxidation catalyst contained in the cathode gas diffusion layer is not contained in the part in contact with the cathode. More specifically, it is desirable that the cathode gas diffusion layer has a first layer not containing the oxidation catalyst and a second layer containing the oxidation catalyst, and is configured so that the first layer may be in contact with the cathode. That is, the cathode gas diffusion layer includes the first layer without the oxidation catalyst and the second layer with the oxidation catalyst, and the first layer is interposed between the cathode and the second layer. The oxidation catalyst is excluded from the first layer.

Further, it is also possible to produce a fuel cell by using such a membrane electrode assembly, a member for supplying a fuel, a member for supplying air (oxygen), and a member for collecting power, and to produce a fuel-cell power-generating system comprising the fuel cell.

Here, it is preferable that the supplied fuel includes an organic substance, and is an aqueous solution containing methanol especially.

A fuel is electrochemically oxidized at an anode, oxygen is reduced at a cathode, and electrical potential difference is caused between the two electrodes. When a load as an external circuit is connected between the two electrodes on this occasion, ions move in an electrolyte and electric energy is extracted to the external load.

The present invention makes it possible to provide the membrane electrode assembly for the fuel cell and the fuel cell system which influence less system efficiency and reduce the amount of the emission of the hazardous materials for a long period of time.

Embodiments according to the present invention are shown hereunder.

Although the following embodiments are described on the basis of a DMFC using a methanol aqueous solution as a fuel, a membrane electrode assembly for a fuel cell and a fuel cell system according to the present invention are not limited to a methanol aqueous solution fuel. For example, a fuel cell using a fuel comprising an aqueous solution containing an organic substance, such as an ethanol aqueous solution fuel can exhibit the effect of inhibiting the amount of emitted hazardous materials. Here, the hazardous materials envisaged in the present invention are methanol which is a fuel component, and formic acid, formaldehyde, and methyl formate which are by-products in case of the DMFC. In the present invention, such hazardous materials are oxidized into carbon dioxide by an oxidation catalyst contained in a cathode gas diffusion layer and the amount of the emitted hazardous materials is inhibited.

FIG. 1 is a schematic sectional view showing a membrane electrode assembly for a fuel cell according to the present invention.

An anode 12 and a cathode 14 are disposed on the surfaces of a solid polymer electrolyte membrane 13 respectively, and further an anode gas diffusion layer 11 and a cathode gas diffusion layer 15 are disposed on the outer sides thereof respectively.

Here, the anode 12 is composed of a catalyst and a solid polymer electrolyte. The catalyst contained in the anode 12 is not particularly limited as long as it is a substance that promotes the oxidation reaction of a methanol aqueous solution as a fuel, and one or more kinds selected from platinum, gold, palladium, iridium, rhodium, ruthenium, iron, cobalt and nickel etc. can be used. It is particularly preferable to use platinum and ruthenium complexly.

Then the cathode 14 is composed of a catalyst and a solid polymer electrolyte. The catalyst contained in the cathode 14 is not particularly limited as long as it is a substance that promotes the reduction reaction of oxygen as an oxidant, and one or more kinds selected from platinum, gold, palladium, iridium, rhodium, ruthenium, iron, cobalt and nickel etc. can be used. It is particularly preferable to use platinum. Further, the catalysts used in the anode 12 and the cathode 14 may be supported by a carrier such as carbon black.

It is preferable to use an acidic hydrogen ion conducting material as the solid polymer electrolytes contained in the anode 12 and the cathode 14 and the solid polymer electrolyte used in the solid polymer electrolyte membrane 13 because the use of the acidic hydrogen ion conducting material makes it possible to realize a stable fuel cell without being affected by carbon dioxide in the atmosphere. As such a material, the following can be used: a sulfonated fluorinated polymer represented by poly-perfluorostyrene sulfonate or perfluorocarbon sulfonate; a material produced by sulfonating a hydrocarbon polymer such as a polystyrene sulfonates, a sulfonated polyether sulfones or a sulfonated polyether ether ketones; and a material produced by alkylsulfonating a hydrocarbon polymer. Here, the solid polymer electrolytes used in the anode 12, the cathode 14, and the solid polymer electrolyte membrane 13 may be either a completely identical material or materials different from each other.

Further, the anode gas diffusion layer 11 is not particularly limited as long as it comprises a porous material having electron conductivity but it is preferable to use carbon paper or carbon cloth. Further, the anode gas diffusion layer 11 may have a microporous layer containing a carbon black and a binder on a surface in contact with the anode 12. When the microporous layer is formed, contact resistance between the anode gas diffusion layer 11 and the anode 12 can be reduced, but the permeability of the fuel is hindered in some cases, and hence the use of the microporous layer is decided in consideration of the operating conditions of the fuel cell system. Here, the binder contained in the microporous layer may be either a water-repellent resin or a hydrophilic resin.

Figure 2:
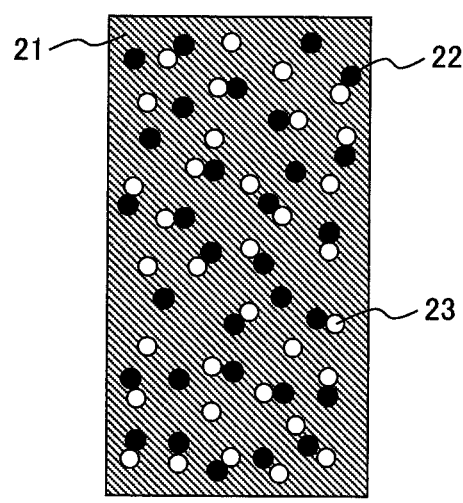
FIG. 2 is a schematic enlarged sectional view showing a cathode gas diffusion layer of an embodiment.

FIG. 2 is a schematic enlarged sectional view showing a cathode gas diffusion layer according to the present invention.

In the cathode gas diffusion layer, a porous material having electron conductivity is used as a base material 21. The base material 21 is not particularly limited but a carbon paper or a carbon cloth is preferably used. A catalyst for oxidizing hazardous materials comprising by-products such as methanol, formic acid and formaldehyde, and a water-repellent resin are contained therein.

As a hazardous material oxidation catalyst 22 (a catalyst for oxidizing hazardous materials), at least one kind selected from platinum, palladium, copper, silver, tungsten, molybdenum, iron, nickel, cobalt, manganese, zinc and vanadium is preferably used. Here, the hazardous material oxidation catalyst 22 may be used either exclusively or in the state of being supported by a carrier such as carbon black. Further, it is preferable to use the hazardous material oxidation catalyst 22 in the state of particles of 1 μm or less in diameter in order to raise a specific surface area.

A water-repellent resin 23 is a resin that does not have polar groups such as a sulfo group and a carboxyl group abundantly and is preferably at least one kind selected from polytetrafluoroethylene, polychlorotrifluoroethylene, polyvinylidene fluoride, polyvinyl fluoride, perfluoro-alkoxy fluororesin, a tetrafluoroethylene-hexafluoropropylene copolymer, an ethylene-tetrafluoroethylene copolymer, an ethylene-chlorotrifluoroethylene copolymer, polyethylene, polyolefin, polypropylene, polyaniline, polythiophene and polyester. By using the water-repellent resin 23 together with the hazardous material oxidation catalyst 22, it is possible to prevent the hazardous material oxidation catalyst 22 from being immersed in water generated through electric power generation reaction or water permeating from the anode 12; and oxidation reaction efficiency from lowering.

Since oxygen is necessary for oxidizing the hazardous materials such as methanol and formic acid emitted from the cathode 14, the supply of oxygen is hindered and the efficiency of oxidation reaction lowers considerably if the hazardous material oxidation catalyst 22 is immersed in water. Here, the oxygen necessary for oxidizing the hazardous materials is used also as oxygen supplied to the cathode 14 as an oxidizer necessary for the electric power generation reaction. The thickness of the cathode gas diffusion layer 15 is not particularly limited but is preferably 30 to 1000 μm. If the cathode gas diffusion layer 15 is too thin, the time necessary for the hazardous materials to pass through the cathode gas diffusion layer 15 shortens and the proportion oxidized with the hazardous material oxidation catalyst 22 decreases undesirably. In contrast, if the cathode gas diffusion layer 15 is too thick, the permeability of oxygen deteriorates and the output of the fuel cell system lowers.

The quantity of the hazardous material oxidation catalyst 22 contained in the cathode gas diffusion layer 15 according to the present invention is not particularly limited but a desirable quantity is $1 \times 10^{-5}$ mol or more per 1 cm$^3$ of the cathode gas diffusion layer 15. Further, the quantity of a water-repellent resin contained in a cathode gas diffusion layer according to the present invention is not particularly limited but a desirable quantity is not less than $3.4 \times 10^{-5}$ g or more per 1 cm$^3$ of the cathode gas diffusion layer 15.

Figure 3:
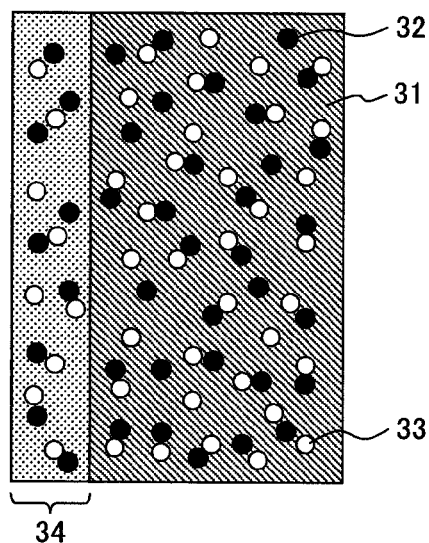
FIG. 3 is a schematic enlarged sectional view showing a cathode gas diffusion layer of another embodiment.

FIG. 3 is a schematic enlarged sectional view showing a cathode gas diffusion layer according to another embodiment of the present invention.

A cathode gas diffusion layer 15 has a microporous layer 34 containing a carbon black and a binder on a surface in contact with a cathode 12. By forming the microporous layer 34 in this way, it is possible to decrease contact resistance between the cathode gas diffusion layer 15 and the cathode 12.

Note that, since the microporous layer 34 may hinder the permeability of oxygen in some cases, it is desirable to decide whether or not the microporous layer 34 should be used in consideration of the operating conditions of the fuel cell system. Here, the binder contained in the microporous layer 34 is a water-repellent resin and the same substance as a water-repellent resin 33 contained in a base material 31 comprising a porous material having electron conductivity is used. Further, a hazardous material oxidation catalyst 32 may be contained also in the microporous layer 34. Here, the thickness of the microporous layer 34 is not particularly limited but a preferable thickness is about 1/20 to 1/4 of the thickness of a base material 31.

Methods for containing a hazardous material oxidation catalyst and a water-repellent resin in a cathode gas diffusion layer are shown hereunder.

Powder of the hazardous material oxidation catalyst is added to water in which the water-repellent resin is dispersed with a surfactant, they are stirred and mixed, thereafter the solution is dripped on a carbon paper, and the carbon paper is dried in the atmosphere. Successively, the carbon paper is baked in the atmosphere, the surfactant is removed, and thereby the cathode gas diffusion layer according to the present invention can be obtained. Here, a preferable baking temperature is 300° C. to 400° C.

Further in another method, a precursor compound (for example, a chloride, a nitrate or an amine complex) of a hazardous material oxidation catalyst is added to and dissolved in water in which a water-repellent resin is dispersed with a surfactant, thereafter the solution is impregnated into a carbon paper, and the carbon paper is dried in the atmosphere. Successively, the carbon paper is baked in the atmosphere and the surfactant is removed. Further, by applying heat treatment in a hydrogen atmosphere, it is possible to reduce the precursor compound of the hazardous material oxidation catalyst into metal and obtain a cathode gas diffusion layer according to the present invention. Here, a preferable treatment temperature in the hydrogen atmosphere is 100° C. to 500° C.

Further in another method, a precursor (for example, an alkoxide or an acetylacetonato complex) of a hazardous material oxidation catalyst is dissolved in alcohol (methanol, ethanol, propanol or the like) in which water-repellent resin powder is dispersed and the alcohol is dripped on a carbon cloth. Thereafter, the carbon cloth is dried in the atmosphere, thereafter the precursor of the hazardous material oxidation catalyst is reduced into metal in a hydrogen atmosphere, and a cathode gas diffusion layer according to the present invention can be obtained.

Further in another method, a cathode gas diffusion layer according to the present invention can be obtained by dispersing a carbon black supporting a particulate hazardous material oxidation catalyst and surfactant powder in alcohol; thereafter impregnating the resultant mixture into a carbon paper; and drying the carbon paper in the atmosphere.

Further in another method, a cathode gas diffusion layer having a microporous layer according to the present invention can be obtained by coating the carbon cloth interfusing the hazardous material oxidation catalyst and the water-repellent resin into beforehand by the aforementioned method with a slurry produced by mixing a carbon black supporting the particulate hazardous material oxidation catalyst, water-repellent resin powder and alcohol; and drying the carbon cloth in the atmosphere. In addition, the hazardous material oxidation catalyst can exhibit the effect of inhibiting hazardous materials from being emitted even when it turns to an oxide during storage or under the power generation circumstance of the fuel cell.

Figure 4:
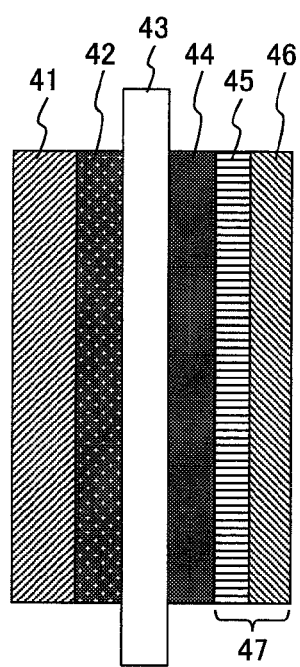
FIG. 4 is a schematic sectional view showing a membrane electrode assembly for a fuel cell of another embodiment.

FIG. 4 is a schematic sectional view showing a membrane electrode assembly for a fuel cell according to another embodiment of the present invention.

A cathode gas diffusion layer 47 has a double-layer structure. A first layer 45 does not contain a hazardous material oxidation catalyst. A water-repellent resin may be contained however.

Meanwhile, a second layer 46 contains the hazardous material oxidation catalyst and the water-repellent resin. If an acidic hydrogen ion conductor is used as a solid polymer electrolyte contained in a cathode 44, Cu, silver, iron, nickel, cobalt, manganese, zinc and vanadium that are hazardous material oxidation catalysts may possibly dissolve when they are in contact with the cathode 44. The dissolved hazardous material oxidation catalysts come to cations, and the cations substitute for hydrogen ions in ion-exchange groups of the solid polymer electrolyte contained in the cathode 44, lowers the hydrogen ion conductivity considerably, and hence lowers the output of the fuel cell.

For that reason, it is possible to inhibit the hazardous material oxidation catalyst from dissolving and avoid lowering the output of the fuel cell by forming the first layer 45 not containing the hazardous material oxidation catalyst at the part in contact with the cathode 44.

Embodiments of a membrane electrode assembly for a fuel cell according to the present invention are concretely explained hereunder in reference to examples.

EXAMPLE 1

In the present example, a membrane electrode assembly for a fuel cell configured as shown in FIG. 1 is produced.

Copper (II) chloride dihydrate that is a precursor compound of a hazardous material oxidation catalyst and polytetrafluoroethylene are added to ion-exchanged water containing a surfactant and mixed well, and thereafter the solution is contained in a sealable plastic bag.

Further, a carbon paper of 200 μm in thickness functioning as a base material is dipped therein, left stilly for one hour at room temperature, and thereby impregnated with the solution containing the copper chloride and the polytetrafluoroethylene. Successively, the carbon paper is taken out and dried for one hour at 120° C. in the atmosphere. Furthermore, the surfactant is removed by baking the carbon paper for one hour at 350° C. in the atmosphere. Thereafter a hazardous material oxidation catalyst comprising copper of a metallic state is formed by processing the carbon paper at 300° C. in a hydrogen atmosphere, and thereby a cathode gas diffusion layer 15 according to the present example is obtained.

A carbon paper of 200 μm in thickness is used as an anode gas diffusion layer 11. Then a Nafion (registered trademark) membrane of 50 μM in thickness is used as a solid polymer electrolyte membrane 13. An anode 12 comprising platinum ruthenium supported on a carbon black and Nafion as the solid polymer electrolyte is formed on a surface of the solid polymer electrolyte membrane 13, and a cathode 14 comprising platinum supported by the carbon black and Nafion as the solid polymer electrolyte is formed on the other surface thereof.

Further, the anode gas diffusion layer 11 is overlaid on the anode 12, the cathode gas diffusion layer 15 is overlaid on the cathode 14, and thereby a membrane electrode assembly for the fuel cell according to the present example is produced. It is possible to decrease hazardous materials emitted from the cathode 14 in the cathode gas diffusion layer 15 by taking such a configuration.

EXAMPLE 2

A membrane electrode assembly for a fuel cell according to the present example is produced by the same method as Example 1 except that palladium (II) chloride is used as a precursor compound of a hazardous material oxidation catalyst in place of copper (II) chloride dihydrate used in Example 1 and a small amount of hydrochloric acid is added to the ion-exchanged water. It is possible to decrease hazardous materials emitted from a cathode in a cathode gas diffusion layer also by taking such a configuration.

EXAMPLE 3

In the present example, a membrane electrode assembly for a fuel cell having such a configuration as shown in FIG. 4 is produced.

Polytetrafluoroethylene is added into ion-exchanged water containing a surfactant, they are mixed well, and thereafter the solution is contained in a sealable plastic bag.

Further, a carbon paper of 100 μm in thickness is dipped therein, left stilly for one hour at room temperature, and thereby impregnated with the solution containing the polytetrafluoroethylene. Successively, the carbon paper is taken out and dried for one hour at 120° C. in the atmosphere.

Furthermore, the surfactant is removed by baking the carbon paper for one hour at 350° C. in the atmosphere and thereby a first cathode gas diffusion layer 45 in a cathode gas diffusion layer 47 is obtained.

Successively, copper (II) chloride dihydrate that is a precursor compound of a hazardous material oxidation catalyst and polytetrafluoroethylene are added to ion-exchanged water containing a surfactant and mixed well, and thereafter the solution is contained in a sealable plastic bag. Further, carbon paper of 100 μm in thickness is dipped therein, left stilly for one hour at room temperature, and thereby impregnated with the solution containing the copper chloride and the polytetrafluoroethylene.

Successively, the carbon paper is taken out and dried for one hour at 120° C. in the atmosphere. Furthermore, the surfactant is removed by baking the carbon paper for one hour at 350° C. in the atmosphere, thereafter the hazardous material oxidation catalyst comprising copper of a metallic state is formed by processing the carbon paper at 300° C. in a hydrogen atmosphere, and thereby a second cathode gas diffusion layer 46 in the cathode gas diffusion layer 47 is obtained.

A carbon paper of 200 μm in thickness is used as an anode gas diffusion layer 41. Further, a Nafion membrane of 50 μm in thickness is used as a solid polymer electrolyte membrane 43. An anode 42 comprising platinum ruthenium supported on a carbon black and Nafion as a solid polymer electrolyte is formed on one surface of the solid polymer electrolyte membrane 43 and a cathode 44 comprising platinum supported by carbon black and Nafion as a solid polymer electrolyte is formed on the other surface thereof.

Further, the anode gas diffusion layer 41 is overlaid on the anode 42, the first cathode gas diffusion layer 45 is overlaid on the cathode 44, further the second cathode gas diffusion layer 46 is overlaid thereon, and thereby a membrane electrode assembly for a fuel cell according to the present example is obtained.

It is possible to decrease the hazardous materials emitted from the cathode 44 in a cathode gas diffusion layer 47 by taking such a configuration. Further, it is possible to inhibit the output of the fuel cell from lowering without causing copper as the hazardous material oxidation catalyst to dissolve by using the cathode gas diffusion layer 47 of a multi-layered structure and disposing the first cathode gas diffusion layer 45 not containing the hazardous material oxidation catalyst on the surface in contact with the cathode 44.

COMPARATIVE EXAMPLE 1

A membrane electrode assembly for a fuel cell according to Comparative example 1 is produced by the same method as Example 1 except that copper is not contained in a cathode gas diffusion layer. In case of such a configuration, a catalyst for oxidizing the hazardous materials emitted from the cathode does not exist and hence it is impossible to decrease the amount of the hazardous materials emitted from the fuel cell.

COMPARATIVE EXAMPLE 2

A membrane electrode assembly for a fuel cell according to Comparative example 2 is produced by the same method as Example 1 except that polytetrafluoroethylene is not contained in a cathode gas diffusion layer. In case of such a configuration, the hazardous material oxidation catalyst in the cathode gas diffusion layer is undesirably immersed in water, hence the oxidation efficiency of the hazardous materials is low, and it is impossible to largely decrease the amount of the hazardous materials emitted from the fuel cell.

EXAMPLE 4

Figure 5:
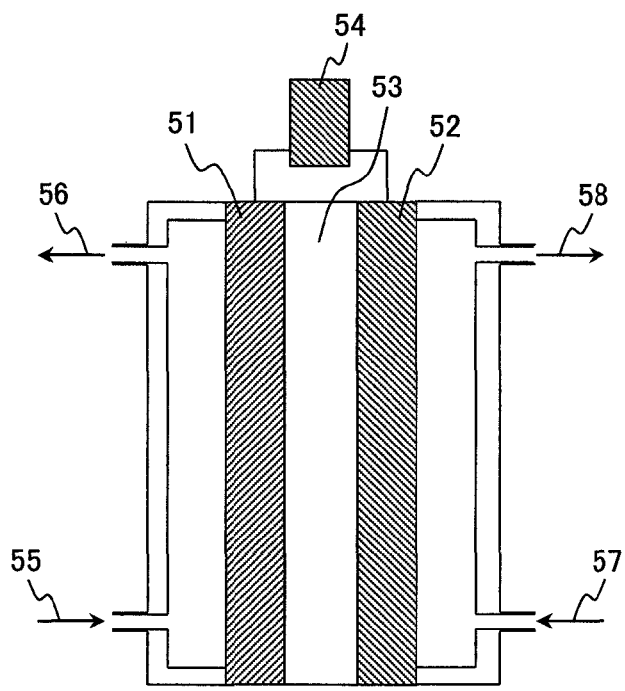
FIG. 5 is a schematic sectional view showing a fuel cell of an embodiment.

FIG. 5 is a schematic sectional view showing a fuel cell according to the present example.

An anode collector 51 is overlaid on an anode gas diffusion layer of a membrane electrode assembly 53 for a fuel cell according to the present example, a cathode collector 52 is overlaid on a cathode gas diffusion layer, and the anode collector 51 and the cathode collector 52 are connected to an external circuit 54. On the anode side, a methanol aqueous solution 55 is supplied, and waste liquid 56 containing carbon dioxide and an unreacted methanol aqueous solution is discharged. On the cathode side, oxygen or air 57 is supplied and an exhaust gas 58 containing water is discharged. A fuel cell thus configured can lower the amount of hazardous materials contained in the exhaust gas 58.

Figure 6:
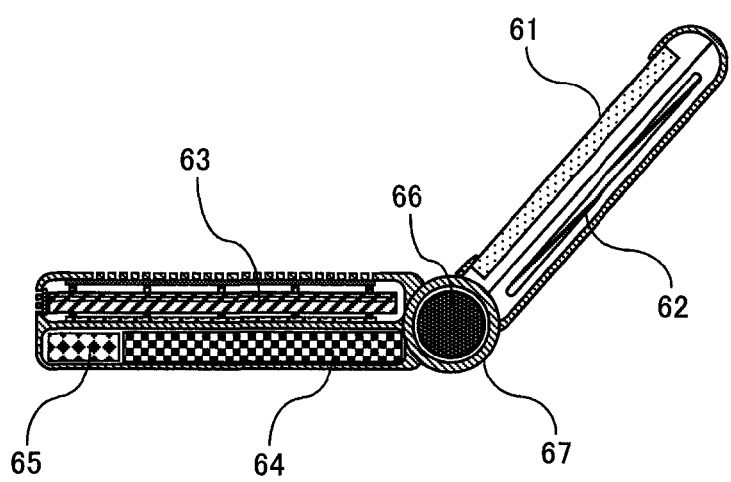
FIG. 6 is a schematic sectional view showing a portable information terminal of an embodiment.

FIG. 6 shows an example of mounting a produced fuel cell on a portable information terminal as an example of a fuel cell power generation system.

The portable information terminal has a foldable configuration comprising two sections connected to each other with a hinge 67 that also functions as a holder of a fuel cartridge 66. One section includes a part incorporating a display unit 61 in which a touch-panel type input device is integrated and an antenna 62. The other section includes a part in which a fuel cell 63, a main board 64 implementing a processor, volatile and nonvolatile memories, an electric power control unit, electronic equipment such as a fuel cell and secondary battery hybrid controller, a fuel monitor, electronic circuits and others, and a lithium ion secondary battery 65 are mounted. A portable information terminal configured as stated above decreases the amount of the hazardous materials emitted from the fuel cell and hence can decrease also the amount of the hazardous materials emitted from the fuel cell system.

The present invention relates to a membrane electrode assembly used for a fuel cell and makes it possible to use such a membrane electrode assembly for a direct methanol type fuel cell.

What is claimed is:

1. A membrane electrode assembly for a fuel cell comprising:
    an anode including a catalyst and a solid polymer electrolyte;
    a cathode including a catalyst and a solid polymer electrolyte;
    a solid polymer electrolyte membrane interposed between the anode and the cathode;
    an anode gas diffusion layer; and
    a cathode gas diffusion layer,
    a set composed of the anode, the cathode and the solid polymer electrolyte membrane being interposed between the anode gas diffusion layer and the cathode gas diffusion layer,
    wherein the cathode gas diffusion layer is impregnated with a mixture of a hazardous material oxidation catalyst and a water-repellent resin,
    wherein the oxidation catalyst is an element selected from the group consisting of platinum, palladium, copper, silver, tungsten, molybdenum, iron, nickel, cobalt, manganese, zinc and vanadium,
    wherein the cathode gas diffusion layer includes a first layer without the oxidation catalyst and a second layer with the oxidation catalyst, and the first layer is interposed between the cathode and the second layer.

2. The membrane electrode assembly according to claim 1, wherein the cathode gas diffusion layer has a microporous layer on a surface in contact with the cathode.

3. A fuel cell comprising:
    the membrane electrode assembly according to claim 1;
    a member for supplying a fuel including an organic substance;
    a member for supplying oxygen; and
    a member for collecting power.

4. The fuel cell according to claim 1, wherein the fuel is an aqueous solution containing methanol.

5. A fuel-cell power-generating system comprising the fuel cell according to claim 4.

* * * * *